United States Patent [19]
Freck

[11] 3,945,884
[45] Mar. 23, 1976

[54] FUEL PARTICLES HAVING PYROLITIC CARBON COATING FOR NUCLEAR REACTORS AND THE MANUFACTURE OF SUCH FUEL

[75] Inventor: David Vernon Freck, London, England

[73] Assignee: Central Electricity Generating Board, London, England

[22] Filed: Sept. 11, 1973

[21] Appl. No.: 396,231

Related U.S. Application Data
[63] Continuation-in-part of Ser. No. 135,231, April 19, 1971, abandoned.

[30] Foreign Application Priority Data
Apr. 20, 1970 United Kingdom............... 18833/70

[52] U.S. Cl...................................... 176/68; 264/.5
[51] Int. Cl.²........................................... G21C 3/02
[58] Field of Search........................... 176/68; 264/.5

[56] References Cited
UNITED STATES PATENTS
| | | | |
|---|---|---|---|
| 3,248,297 | 4/1966 | Moore et al.................... | 176/19 LD |
| 3,339,070 | 8/1967 | Main ........................... | 250/83.6 FT |
| 3,459,634 | 8/1969 | Ruiz et al..................... | 252/301.1 R |
| 3,555,278 | 1/1971 | Schroeder.................... | 250/83.6 FT |
| 3,649,452 | 3/1972 | Chin et al. .................. | 176/68 |
| 3,650,896 | 3/1972 | Goeddel............................... | 176/68 |
| 3,798,123 | 3/1974 | Lindemer............................. | 176/68 |

Primary Examiner—Verlin R. Pendegrass
Assistant Examiner—Peter A. Nelson
Attorney, Agent, or Firm—Edward F. Connors

[57] ABSTRACT

Particle fuel, such as is used in high temperature nuclear reactors, and having the fuel material coated with a pyrolytic carbon coating impermeable to gaseous fission products and embedded in a matrix of graphite, incorporates radium 226 which may be included in the binder for the grains of the fuel. During the manufacturing process, the integrity of the pyrolytic carbon coating can be checked before irradiation in a reactor by circulating an inert gas such as argon over the particles at a temperature in excess of 800°C. This may be carried out in the final carbonisation step during manufacture or immediately before vacuum degassing. The inert gas after passing over the particles is checked for the presence of radon 222, for example by passing the gas into a decay chamber having a filter in its outlet to collect radio active solid daughters of radon and counting the alpha particles emitted by the material collected by the filter. It is thus possible to test the integrity of the pyrolytic carbon coating before the fuel is irradiated.

6 Claims, 2 Drawing Figures

FUEL PARTICLES HAVING PYROLITIC CARBON COATING FOR NUCLEAR REACTORS AND THE MANUFACTURE OF SUCH FUEL

REFERENCES TO RELATED APPLICATIONS

This application is a continuation-in-part of application Ser. No. 135231 filed Apr. 19th 1971, and now abandoned.

BACKGROUND OF THE INVENTION

This invention relates to particle fuel (such as is used for high temperature nuclear reactors) of the kind in which the fuel material is coated with a pyrolytic carbon coating impermeable to gaseous fission products and embedded in a matrix of graphite and is concerned more particularly with the testing of such fuel particles to determine the integrity of the coating against any fission gas leakage.

In considering the problem of testing such fuel particles it will be borne in mind that these particles are quite small and that far greater numbers of fuel particles are employed in a high temperature reactor using such carbon coated fuel particles compared with the number of fuel cans in earlier types of graphite moderated gas-cooled reactors operating at lower temperatures such as the Magnox and A.G.R. reactors. There may, for example, be of the order of $10^{10}$ particles in a reactor fuel charge for a high temperature reactor and the level of defect that is required to be measured lies in a range of one in $10^4$ to one in $10^6$ fully failed particles. It is an object of the present invention to provide a method of testing such particles in a way which is directly relevant to the fission gas release in the reactor and to this standard. One of the requirements is that the testing should be effected before the particles are irradiated in the reactor. With the very large numbers of particles, it is not practicable to load them into the reactor and to check and remove faulty elements after irradiation.

In checking before irradiation, however, a further problem arises with the carbon coated fuel particles in that, although the inner pyrolytic carbon coating has to provide the effective containment of fission gas products, at low temperatures, the matrix graphite will also effectively contain such products although at high temperatures they will diffuse through this matrix graphite.

SUMMARY OF THE INVENTION

According to one aspect of the present invention a method of manufacturing fuel particles for a nuclear reactor having fuel material coated with a pyrolytic carbon coating surrounded by an outer matrix graphite includes the steps of incorporating radium 226 into the fuel material, coating the fuel material with at least one pyrolytic carbon coating, surrounding the coated fuel material with matrix graphite.

The fuel material before applying the pyrolytic carbon coating is formed into a green kernel which is then sintered. The sintered kernel may be coated with a silicon carbide layer between two pyrolytic carbon layers. In forming a fuel body, a number of such kernels with their pyrolytic carbon coatings may be overcoated with matrix graphite.

The testing of the integrity of the coating may be made following the completion of manufacture but very conveniently the heating for the testing may be a heating stage in the manufacture of the particles. It may, for example, be the heating during the final carbonisation step in making the fuel bodies which step is normally at a temperature of 800° to 900°C. However, after this carbonisation, the bodies are normally vacuum degassed at a temperature typically of the order of 1800°C and it may be more convenient to effect the test by heating to this degassing temperature and, after effecting the test, carrying out the vacuum degassing of the bodies at this temperature. The carbonisation and degassing steps may be combined by passing the bodies through a furnace with two heating zones at the appropriate temperatures, e.g. the first at 900°C and the second at 1600°C, the degassing being performed in a flowing gas stream; the testing, as before, may be effected by checking for the presence of radon in the gas stream.

The higher the temperature, the more quickly will the radon 222 diffuse through the matrix graphite. If a relatively low temperature of 800°C is employed, in order to reduce the delay to the testing process caused by the time that radon would take to diffuse out of the fuel material grains of the kernel of the particle, it may be preferable to ensure that the radium is coated on the surface of these grains of the fuel material in the kernel of the particle, for example by incorporating the radium in the binder employed to bind the grains together during the kernel manufacture and sintering process. As examples of suitable binding materials, a paraffin or ketone binder may be employed but preferably stearic acid or aluminium stearate is employed as the binder. The radium may be incorporated in the binder in the form of radium stearate. The amount of radium required to be incorporated in the particles is very small. Systems have been built to detect quantities of radon as small as $10^{-14}$ Curies (which give only one to two disintegrations per hour). The quantity of radium to be added to fuel is governed not therefore by the limits of detection techniques but by the time in which it is required to conduct the test and the limitations of convenient detection techniques. The amount of radium required is very small, typically less than 1 part in $10^8$ parts of uranium (by weight), and should not cause any difficulty in the manufacturing process if the ventilation is adequate.

The invention furthermore includes within its scope a nuclear reactor fuel particle of the kind in which the fuel material is coated with a pyrolytic carbon coating and with an outer matrix graphite coating wherein a small quantity of radium 226 is incorporated in the fuel material. For a uranium fuel, the radium may be less than 1 part in $10^8$ parts (by weight) of the uranium. It may be coated on the grains of the fuel material or incorporated in a binder for the fuel material grains.

The fuel material in the particles is typically uranium oxide or a mixture of uranium and thorium oxide. Other materials however may be employed, e.g. uranium carbide.

The testing of these nuclear reactor fuel particles of the above-described kind in which the fuel material has a pyrolytic carbon coating and is embedded in a matrix of graphite and incorporates radium 226 may be carried out in apparatus comprising means for heating the fuel particles in a closed furnace to a temperature of at least 800°C, means for circulating an inert gas through the furnace and through a decay chamber having, in its exit, a filter for collecting radio active solid daughters of radon, and means for checking the presence of any such radio active material on the filter. The checking is preferably effected by means of a counter counting any alpha particles emitted by the material collected on the filter.

It is desirable to check the amount of radium in the fuel before looking for radon release. The radium in the fuel may be measured by gamma ray spectroscopy. However, to obviate the need to wait for the radon to come into equilibrium with the radium (radon 222 has a half-life of 3.8 days), the quantity of radon daughters in the fuel may be checked by gamma ray spectroscopy before looking for radon release.

For calibration purposes, a secondary loop containing a known radon source may be provided, the gas being circulated through the radon source and decay chamber. The source conveniently is a solution of a known quantity of radium chloride in hydrochloric acid to give a pH of about 2, the gas being bubbled through the solution to release the radon.

The above-described method and apparatus provides a non-destructive test technique to check the integrity of the particle coatings against release of gaseous fission product and it has a particular advantage in that the test can be carried out if desired after the particles have been compacted.

BRIEF DESCRIPTION OF THE DRAWING

In the following description reference will be made to the accompanying drawing in which.

DESCRIPTION OF THE PREFERRED EMBODIMENT

Figure 1:
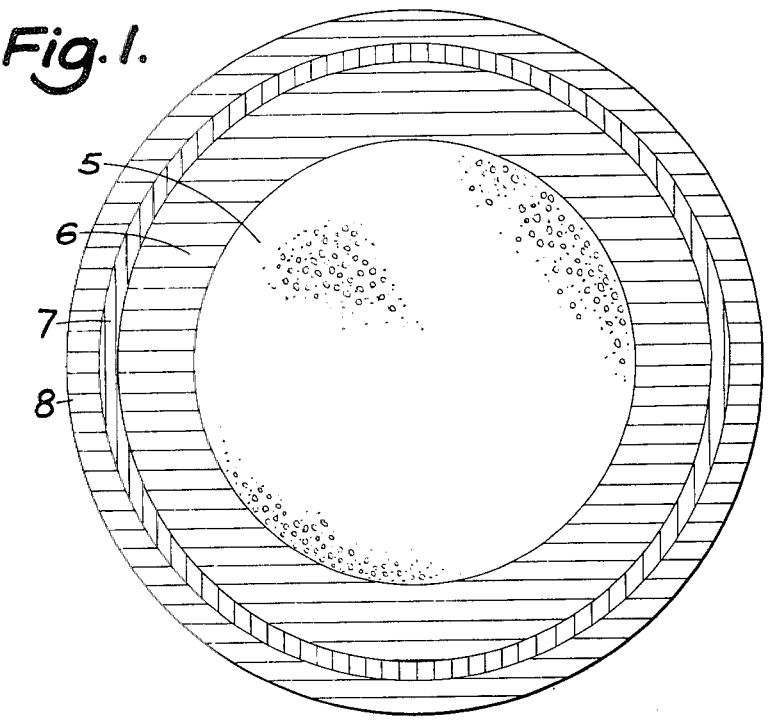
FIG. 1 is a cross-sectional view of a fuel particle having a pyrolytic carbon coating and outer matrix graphite for use in a high temperature nuclear reactor.

The manner of making fuel particles for high temperature gas-cooled reactors of the kind having fuel material in a pyrolytic carbon coating or coatings surrounded by matrix graphite is well-known and will only be outlined in the following description except in so far as mention is made of the distinctive and novel features of manufacture which are significant in relation to the present invention which enables the integrity of the pyrolytic carbon coating of the fuel particles to be tested without irradiation in a reactor.

The fuel particles in this example have an inner kernel of compacted powdered uranium dioxide fuel material. As is known, however, other materials such as uranium carbide or mixed oxides or carbides, e.g. uranium and thorium oxide or uranium and thorium carbide, may be employed. The uranium dioxide is in the form of a fine powder, typically having a surface area of 4 m$^2$/g. This is mixed with a small percentage of carbon black, typically 5% by weight, and with a suitable binder, typically ½% by weight the material being mixed in a ball mill. The binder may be aluminium stearate which is commonly employed as a binder in manufacturing fuel particles of this nature but it is preferred to use stearic acid. In accordance with the present invention the binder however is doped with radium 226. The quantity of radium 226 is quite small and it is preferred to use approximately 10 micro Curies of radium 226 per kilogram of uranium. The powder is then agglomerated by being put in an agitated container, typically a drum rotated eccentrically, the powder being fed in at a controlled rate. The powder particles agglomerate slowly to form spheres. Typically these spheres, when about 250 microns diameter, are taken out and used as seed spheres in a further agglomerator into which powder is added at a controlled rate. Agglomerators are used in cascade to produce spheres of typically 1000 microns diameter which constitute the green kernels of the fuel material. These kernels are then subjected to heat treatment stages using different atmospheres for the various stages. As one example, the material is first heated typically to 1300°C in an atmosphere of carbon monoxide (to prevent formation of uranium carbide) this heating stage being to carbonise the binder meaterial and to sinter the kernels. The sintered kernels are then heated in a flowing mixture of $CO_2$ and CO to decarbonise the material; the carbon from the stearic acid and the carbon black is converted to carbon monoxide and driven off leaving porosity in the kernel in this stage. After the carbon has been driven off, the material is then heated to a higher temperature to sinter the uranium oxide, typically at a temperature of 1450°C.

Other techniques are known and, in particular, to obtain the porosity, instead of using carbon black with uranium dioxide, one can start with $U_3O_8$, subsequently reducing it to $UO_2$ after the grains have been bound together.

After sintering, the kernels are coated with two layers of pyrolytic carbon. A layer of porous carbon may be formed before applying the first pyrolytic carbon layer in order to extend the porosity of the fuel. There may also be a layer of silicon carbide between the two pyrolytic carbon layers. The purpose of the pyrolytic carbon is to retain the gaseous fission products. The silicon carbide layer, if provided, is to retain metallic fission products but it also assists in retaining gaseous products. The coating with the pyrolytic carbon layers is effected by putting the sintered kernels in a fluidised bed coating furnace through which an appropriate reactant gas, such as propylene or methane, is passed. For a silicon carbide layer, the gas employed is methyltrichlorosilane. The methods of producing such coatings on fuel bodies are known in themselves (see for example British Patent Specification No. 1055232 and U.S. Pat. No. 3298921) and will not be further described.

FIG. 1 illustrates a particle at this stage. The particle has a kernel 5 formed of sintered powdered uranium oxide material. The radium 226 from the binder remains on the surface of the finely powdered uranium oxide. This kernel has a first pyrolytic carbon coating 6, a silicon carbide coating 7 and an outer pyrolytic carbon coating 8.

The particles are then overcoated with a graphite resin mixture by feeding the overcoating material at a controlled rate into a mixer with the particles. The coated particles are then put in a die to form the shape of the appropriate fuel bodies which may contain many particles. The actual form of the fuel bodies depends on the reactor design. There are a number of different ways in which particles of this nature may be employed. For example, the particles may be embedded in large blocks of matrix graphite. In another arrangement, the particles may be formed into relatively small fuel pins for insertion into channels in a graphite core. The present invention is applicable quite generally to all such fuel bodies.

The essential novelty of the process thus far described lies in the incorporation of the radium 226 in the fuel kernels. It is the presence of this radium 226 which permits of the non-destructive testing of the fuel particles or fuel bodies before irradiation in a reactor in order to check the integrity of the pyrolytic carbon coatings in retaining gaseous fission products. This check permits of monitoring of the production stages during the manufacture of the fuel bodies. Particularly during the incorporation of the pyrolytic carbon coated particles in large blocks of matrix graphite, the possibility arises of mechanical damage to the pyrolytic carbon coating during the processing. The presence of the radium 226, as hereinafter described, permits the subsequent checking of the integrity of these coatings without irradiation in the reactor.

The testing of the coatings is conveniently carried out on the particles with their pyrolytic carbon coating after they have been overcoated with the matrix graphite. As has been indicated above the fuel bodies may contain a large number of particles but this is not necessarily so. The testing procedure however is applicable to both large and small fuel bodies. In forming the matrix overcoating of graphite, after the carbonisation process at a temperature of 800° to 900°C, the particles are heated to a temperature typically of 1800°C and then vacuum degassed. The testing may be carried out during the carbonisation stage but it is conveniently carried out during the heating stage before the vacuum degassing.

Figure 2:
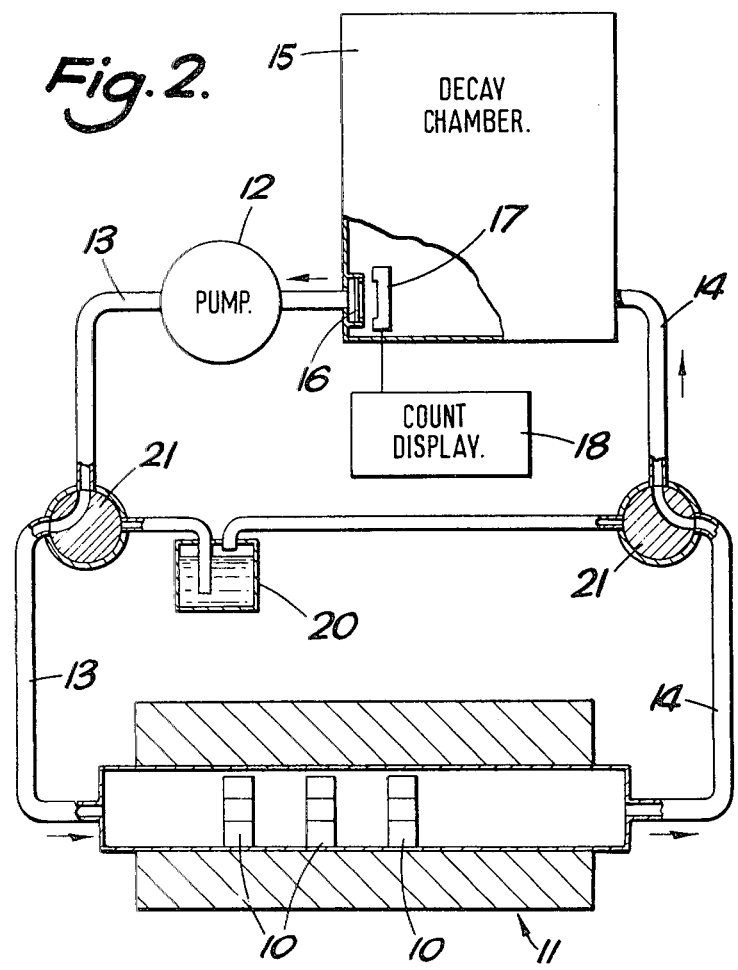
FIG. 2 illustrates diagrammatically an apparatus for testing the integrity of the pyrolytic carbon coating of the nuclear fuel particles.

FIG. 2 illustrates the test apparatus for testing the fuel bodies and shows the fuel bodies 10 in a closed tubular furnace 11 which may be the furnace for heating the particles prior to degassing. By means of a pump 12, an inert gas is circulated through a pipe 13 into the furnace and out through a pipe 14 to a decay chamber 15. This inert gas (which may be any gas which will not react with the particles or the material of the equipment) will carry with it any radon 222 which escapes from the fuel particles on heating. This radon decays in the decay chamber 15 and the radio active solid daughters of the radon are filtered at the exit of the chamber by a filter 16 (conveniently a cellulose acetate type filter) and their presence on the filter is checked by means of an alpha particle counter 17 (e.g. a solid state silicon surface barrier detector) which counts alpha particles emitted by the material collected on the filter, the count being shown on a display 18. Any escape of radon indicates faults in the pyrolytic carbon coating and hence the counter indication provides a measure of the proportion of faulty coatings in the particles under test.

For calibration purposes, there is provided a known radon source comprising a vessel 20 containing a known quantity of radium chloride in an aqueous solution with sufficient hydrochloric acid to give a pH of about 2; the hydrochloric acid is to keep the radium chloride in solution. By means of valves 21, the gas stream can be diverted to bubble through the radium chloride solution to release the radon. For calibration, the gas passes through the vessel 20 and into the decay chamber 15 where the radon decays and is measured by the counter 17.

It is desirable to check the quantity of radium in the fuel particles before looking for radon release. This may be done by gamma ray spectroscopy. As a refinement, the quantity of radon daughters may also be checked by gamma ray spectroscopy; this obviates the need to wait until the radon has come into equilibrium with the radium.

I claim:

1. A nuclear reactor fuel body of the kind in which the fuel material is in the form of a kernel coated with a pyrolytic carbon coating and with an outer matrix graphite coating wherein a small quantity of radium 226 is incorporated in the kernel.

2. A nuclear reactor fuel body as claimed in claim 1 wherein the fuel material is uranium and wherein the radium 226 is less than one part in $10^8$ parts by weight of uranium.

3. A nuclear reactor fuel body as claimed in claim 1 wherein the fuel material is in granular form in said kernel of a fuel particle with the grains bound together by a binder and wherein the radium 226 is incorporated in the binder, said fuel body comprising a plurality of said fuel particles within outer matrix graphite.

4. A nuclear reactor fuel body as claimed in claim 1 wherein the fuel material is in granular form in the kernel of the particle and wherein the radium 226 is coated on the surface of the grains of fuel material.

5. A nuclear reactor fuel body as claimed in claim 3 and employing a mixture of radium stearate and aluminium stearate as the binder.

6. A nuclear reactor fuel body as claimed in claim 1 wherein the kernel has a silicon carbide coating between pyrolytic carbon coatings.

* * * * *